United States Patent Office 3,441,897
Patented Apr. 29, 1969

3,441,897
DEVICE FOR TRANSMITTING ELECTRICAL MEASUREMENTS
Jean Charlade, Bagnols-sur-Ceze, France, assignor to Commissariat à l'Energie Atomique, Paris, France
Filed June 7, 1966, Ser. No. 555,831
Claims priority, application France, June 23, 1965, 21,958
Int. Cl. H01r 13/20, 25/00; G21c 3/30
U.S. Cl. 339—30    6 Claims

ABSTRACT OF THE DISCLOSURE

An electric switch for use between fuel elements in the duct of a nuclear reactor is actuated by the temperature at the fuel element and has a base of electrically insulating material with a cap screwed onto the base. A bimetallic element is mounted in the base beneath the cap and is centrally connected to an insulating washer. An insulating ring is mounted on the washer and a circular contact is mounted on the ring. A central contact is mounted within the ring and spaced from the circular contact. A second bimetallic element supports the central contact.

---

This invention relates to a device for transmitting electrical measurements, as applicable in particular to fuel elements which are placed in a nuclear reactor channel.

It is known that certain reactors containing fuel elements which are assembled end-to-end and placed in contact with one another within rectilineal channels call for special arrangements for the purpose of collecting information at the level of any particular fuel element during operation of the reactor and for the purpose of directing such information to the exterior of the reactor at the ends of the channels. This is especially the case with temperature measurements taken by means of a thermocouple attached to a given fuel element which must be electrically connected to a measuring instrument located outside the reactor. Taking into account certain essential requirements, including the possibility of withdrawing certain fuel elements without breaking the electrical connections, such connections are usually established by means of two-pole contacts which are mounted at the fuel element extremities and applied against corresponding contacts of adjacent fuel elements.

In an arrangement of this type, it is already known to equip each fuel element at both ends thereof with a device comprising a central contact-stud mounted on a rigid end-piece which is integral with the fuel element end-cap and a peripheral contact-stud carried by the edge of a flexible cup having a diametrical dimension which is substantially equal to that of the end-cap and fixed coaxially with the central contact-stud. The connection between contact-studs of the same type from one end of any fuel element to the other is carried out by means of sheathed electrical conductors whilst the connection between two successive fuel elements in a reactor channel is carried out by establishing a simple contact between the corresponding contact-studs of said two fuel elements, this being achieved especially by virtue of the flexibility of the cups which support the peripheral contact-studs.

An arrangement of this kind usually proves fully satisfactory in the particular case in which the channel considered is vertical, the weight of the fuel elements being such as to exert a sufficient stress on the flexible cups to ensure that suitable electrical contacts are established. However, the same no longer applies when the fuel channel is horizontal. Moreover, the repeated thermal cycles to which a reactor is subjected and which can introduce differences of the order of 400° C. between reactor shutdown and operation at full power result in impairment of the properties of flexibility of the contact-cups and can consequently affect the efficiency of the contacts.

The present invention is directed to a device for transmitting electrical measurements which is primarily designed for use in a nuclear reactor channel and which overcomes the disadvantages noted above.

To this end, the aforesaid device is of the type comprising a pair of contact-studs which are insulated electrically and adapted to cooperate with an identical pair of corresponding contact-studs located in oppositely-facing relation, and is characterized in that each pair of contact-studs is associated by means of a bimetallic element with at least one insulating washer which is adapted to move within a stationary upport, said bimetallic element being secured to said washer on the one hand and freely mounted within a groove of said support on the other hand.

The device considered thus employs the progressive and accurately-responsive deformation of a conventional bimetallic element under the action of temperature which permits of relative motion of the contact-studs of the oppositely-facing pairs in such a manner that the movements of the two pairs of contacts are co-ordinated and establish electrical contact between corresponding contact-studs or separate these latter. The extreme limits of temperatures which are contemplated correspond respectively under these conditions to a position of utilization of the device at high temperature which corresponds to reactor operation at power and to a rest position at a low temperature which corresponds to reactor shutdown.

In a preferred embodiment of the invention in which each pair of contact-studs comprises a central contact and an annular peripheral contact which surrounds said central contact, said washer of revolution carries said peripheral contact on one of its faces and is provided with an extension which is adapted to engage in an axial opening formed at the center of said bimetallic element, said groove of the support being a circular groove which is coaxial with said washer. As an advantageous feature, said central contact is mounted in a recess of said washer and is supported by mean of a second bimetallic element which is secured at its center to said contact, said second bimetallic element being engaged in a second circular groove which is coaxial with said central contact and formed inside said recess.

In another embodiment, said central contact is mounted on a pin which passes through an axial bore of said washer and is secured at its center to a second bimetallic element which is engaged in a second circular groove formed in said support.

Other properties and advantages of the device under consideration will become readily apparent from a study of the following description of a number of examples of construction which are given by way of indication and not in any sense by way of limitation.

Figure 1:
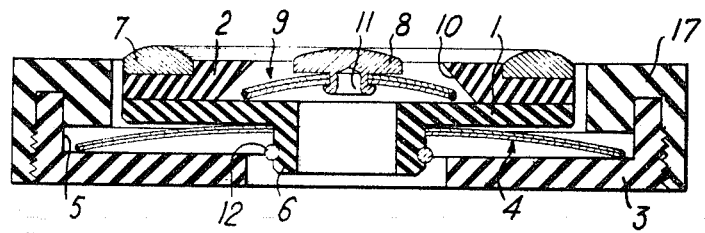
FIG. 1 is a diagrammatic view which illustrates the principle of the electrical measuring device as shown in the position which corresponds to high-temperature operation.

The device for transmitting electrical measurements which is illustrated diagrammatically in FIG. 1 comprises an insulating washer of revolution which is made up of a lower washer 1 and upper washer 2 which are rigidly fixed to each other. The lower washer 1 is coupled to a support 3 having a generally cylindrical shape and coaxial with the washer by means of a bimetallic element 4 which is applied at its periphery against the bottom of a groove 5 formed within the interior of the support 3. The bimetallic element 4 is provided with a central opening in which is engaged a tubular extension 6 of the washer 1 in coaxial relation with the bimetallic element. A snap-ring or circlip 12 which is placed within a groove of the extension 6 prevents the release of the cup 1 from the bimetallic element 4. The position of said snap-ring is such that it nevertheless permits of slight displacement of the bimetallic element with respect to the cup 1 during operation as will be explained in greater detail below.

The upper washer 2 is provided on that face which is remote from the washer 1 with an electric contact 7 of generally circular shape and disposed at the periphery of the washer; in the remainder of the description, said contact 7 is designated by the term "peripheral." Accordingly, said peripheral contact 7 surrounds a second contact 8 which is disposed at the center of the washer 2 on the axis of the device; said central is secured to a second bimetallic element 9 which is applied at its periphery within a groove or channel 10 which is formed within the washer 2, said channel being preferably provided in the form of a frustoconical recess. The central contact 8 is maintained applied against the bimetallic element 9 by means of rivet 11 or by any like means.

The two bimetallic elements 4 and 9 which are employed in the construction of the device hereinabove described are preferably formed by means of two stainless steel sheets which are bonded to each other and which have different coefficients of expansion. Among bimetallic elements of this type, preference is given to those which are marketed under the registered trademark "Highflex" as manufactured by the company known as H. A. Wilson of Union, N.J. (U.S.A.), and the characteristics of which are as follows: deflection in mm./° C. in the case of a strip having a length equal to 100 mm. and a thickness equal to 1 mm.: 0.135; modulus of elasticity in kg./mm.$^2$: 17,600; maximum temperature of utilization in ° C.: 540. These bimetallic elements are stabilized after treatment over a period of several hours at a temperature of 345° C. which is in the vicinity of the maximum operating temperature. In addition, the bimetallic element 4 is treated so as to ensure that its deflection in the cold state is reverse to its deflection in the hot state whereas the bimetallic element 9 is treated in such a manner as to ensure that, as a result of temperature variations, only its camber varies whilst its deflection remains solely unidirectional.

Figure 2:
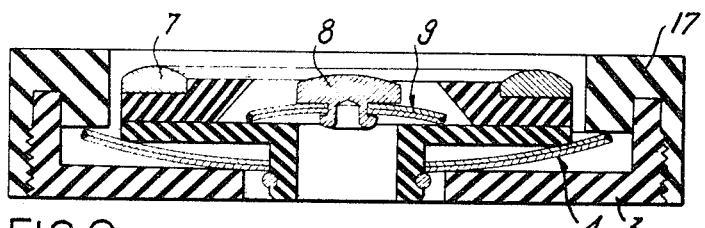
FIG. 2 shows the same device in the position corresponding to low-temperature operation.

FIGS. 1 and 2 illustrate diagrammatically the operation of the device which is contemplated by the invention, as shown in two successive positions which correspond respectively to a high temperature (for example the temperature which prevails in a reactor channel under operating conditions) and to a low temperature (namely the temperature which prevails in the same channel during a period of shutdown of the reactor). In FIG. 1, the convexity of the bimetallic element 4 is shown as being directed towards the insulating washer which is formed by the washers 1 and 2. Moreover, the bimetallic element 9 is in a position in which its camber is at maximum value. Under these conditions, the contacts 7 and 8 project externally of the apparent contour of the support 3. On the other hand, in FIG. 2, the convexity of the bimetallic element 4 is shown as being directed in the opposite direction whilst the curvature of the bimetallic element 9 is accordingly reduced; the contacts 7 and 8 are in that case withdrawn with respect to the apparent contour of the support 3. It should be noted that the particular arrangement of the two contacts 7 and 8 makes it possible for the contact 8 to move with respect to the contact 7 so that any lack of precision which may arise during assembly has no influence on the movements of said contacts. Furthermore, the efforts exerted on the contacts by the bimetallic elements always have known values. Thus, the central contact 8 is subjected in the position shown in FIG. 1 to a thrust which is equal to the sum of the thrusts produced by both bimetallic elements whilst the peripheral contact 7 is subjected to the difference between said thrusts. Preferably, the two bimetallic elements are so designed that the thrust exerted by the bimetallic element 4 which is of larger size is equal to double the value of thrust exerted by the bimetallic element 9 which is of smaller size.

Figure 3:
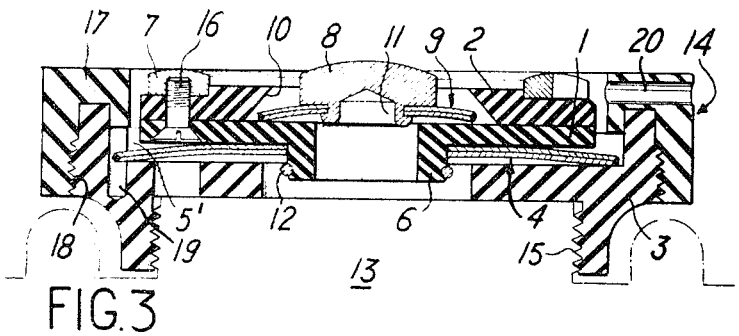
FIG. 3 is an axial sectional view of a first embodiment of the device.

FIG. 3 illustrates an embodiment of the device herein contemplated, the principle of operation of which has just been described. In this figure, there can be seen the extremity 13 of a nuclear reactor fuel element which is intended to be placed within a fuel channel (not shown in the drawings). There is fitted on said extremity 13 a cap 14 which carries in particular the support 3 of FIG. 1 which is screwed onto the fuel element at 15. The lower washer 1 is supported by its extension 6 on the bimetallic element 4, the periphery of which is in turn brought to bear within the groove 5' of the support 3. The upper washer 2 is fixed on the lower washer 1 by means of bolts 16 which also serve to secure the peripheral contact 7. The central contact 8 is in turn secured to the bimetallic element 9 by means of the rivet 11, the periphery of said bimetallic element 9 being engaged within the channel 10 which is provided between the two washers 1 and 2. The complete assembly is held in position on the support 3 by means of a nut 17 which is screwed at 18. A pin 19 which penetrates into a recess of the bimetallic element 4 serves to guide this latter during its displacement. The contacts 7 and 8 are connected by electric lead-wires (not shown) to similar contacts located at the other end of the fuel element, said lead-wires being passed in particular through a bore 20 which is drilled in the nut 17.

The fuel element as thus equipped at both ends is placed in its fuel channel between other identical fuel elements, each fuel element being thus provided with corresponding contacts. During operation, the deflection of the bimetallic elements initiates the outward displacement of the contacts so that these latter project beyond the apparent contours of the different fuel elements and brings said contacts into flexible contact from one fuel element to the next. By means of the cooperation of the contacts from each fuel element to the next, it is thus possible to transmit along the reactor channel a voltage representing a measurement taken on any one fuel element which is selected from all the other fuel elements contained in said channel. By way of example, a measurement of this kind can be applied to a potential difference supplied by a thermoelectric probe which is located on a fuel element and the lead-wires of which are connected to the two contacts of said fuel element, this measurement being subsequently transmitted to the exterior of the reactor channel by way of all the other fuel elements.

The utilization of bimetallic elements proves to be of particular interest in an application of this type by virtue of the fact that such elements are essentially endowed with excellent mechanical strength at high temperature and consequently provide a substantial improvement over the spring-type devices which were employed in the prior art. These bimetallic elements also afford good resistance to repeated thermal cycles and their accurate responsiveness ensures perfect uniformity of measurements inasmuch as the resultant thrust exerted on the contact-studs of two adjacent fuel elements is constant.

During cooling periods, the assembly of components shrinks and thus opens the electric circuit whereas, during a temperature rise, measurements are resumed from a relatively low threshold, the deflection of the bimetallic elements being more rapid than the expansion of the supporting members.

Figure 4:
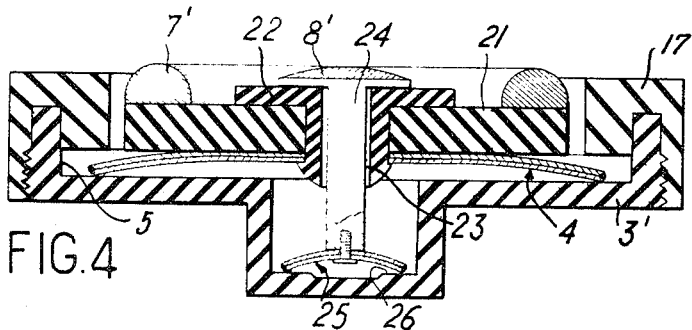
FIG. 4 is a diagrammatic view of an alternative embodiment of the same device.

It will be readily understood that the invention is not limited in any sense to the mode of construction which has been described in the foregoing. Thus, in an alternative form which is illustrated in FIG. 4, the washers forming the insulating washer can be freely mounted with respect to each other and each associated with a different bimetallic element. It can be seen from FIG. 4 that the peripheral contact 7' is carried by a washer 21 which is associated with the bimetallic element 4, the extremity of which is engaged in the groove 5 of the support 3'. The bimetallic element 4 is immovably secured with respect to the washer 21 by means of an electrically insulating clamping member 22, a flange of which serves to imprison the central portion of the bimetallic element 4. The washer 21 and the member 22 are bored internally and axially at 23 so as to provide a passageway for a cylindrical pin 24, the upper end of which supports the central contact 8. The lower end of the pin 24 is secured to a second bimetallic element 25, the periphery of which is applied against the bottom 26 of the support 3'. In this alternative form, the two contacts 7' and 8' have displacements initiated separately by the deflections proper of the two bimetaillic elements 4 and 25.

What I claim is:

1. A device for transmitting electrical measurements comprising a pair of electrically insulated contacts one mounted within the other, said pair of contacts being actuated by a bimetallic element and at least one insulating washer moving within a stationary support supporting said pair of contacts, said bimetallic element being secured to said washer and freely mounted within a groove in said support.

2. A device as described in claim 1, said pair of contacts comprising a central contact and an annular peripheral contact surrounding said central contact, said washer carrying said peripheral contact on one of its faces and an extension for said washer engaging in an axial opening at the center of said bimetallic element, said groove of said support being a circular groove which is coaxial with said washer.

3. A device as described in claim 2, said central contact being mounted in a recess of said washer and being supported by a second bimetallic element secured at its center of said contact, said second bimetallic element being engaged in a second circular groove coaxial with said central contact and formed inside said recess.

4. A device as described in claim 3, said second bimetallic element exerting a thrust which is double that of the other bimetallic element.

5. A device as described in claim 2, said central contact being mounted on a pin passing through an axial bore in said washer and secured at its end to a second bimetallic element engaged in a second circular groove formed in said support.

6. A device as described in claim 1, said support being fixed on the extremity of a nuclear reactor fuel element.

References Cited

UNITED STATES PATENTS

| | | |
|---|---|---|
| 1,897,316 | 2/1933 | Marshall. |
| 2,324,161 | 7/1943 | Holmes. |
| 2,637,799 | 5/1953 | Wood. |
| 3,175,956 | 3/1965 | Liermann _____ 176—77 |

MARVIN A. CHAMPION, *Primary Examiner.*

P. A. CLIFFORD, *Assistant Examiner.*

U.S. Cl. X.R.

176—77; 339—48